United States Patent
Anand et al.

(10) Patent No.: US 7,955,588 B2
(45) Date of Patent: Jun. 7, 2011

(54) METAL SULFIDE CATALYSTS AND METHODS OF MAKING SAME

(75) Inventors: Madhu Anand, Bartlesville, OK (US); Brian C. Dunn, Bartlesville, OK (US); Glenn W. Dodwell, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 12/783,663

(22) Filed: May 20, 2010

(65) Prior Publication Data

US 2010/0304964 A1  Dec. 2, 2010

Related U.S. Application Data

(60) Provisional application No. 61/181,179, filed on May 26, 2009.

(51) Int. Cl.
*B01J 27/04* (2006.01)
*B01J 27/047* (2006.01)
*B01J 27/051* (2006.01)
*B01J 37/20* (2006.01)
*C07C 9/04* (2006.01)

(52) U.S. Cl. ......... 423/561.1; 423/55; 423/65; 502/219; 502/220; 518/714

(58) Field of Classification Search .......... 423/55, 423/65, 561.1; 502/219, 220; 518/714
See application file for complete search history.

(56) References Cited

U.S. PATENT DOCUMENTS

| | | | |
|---|---|---|---|
| 4,151,190 A | 4/1979 | Murchison et al. | |
| 4,208,394 A * | 6/1980 | Chianelli | 423/561.1 |
| 4,243,553 A | 1/1981 | Naumann et al. | |
| 4,243,554 A | 1/1981 | Naumann et al. | |
| 4,323,480 A * | 4/1982 | Dines et al. | 502/215 |
| 4,430,442 A | 2/1984 | Sawyer et al. | |
| 4,491,639 A | 1/1985 | Happel et al. | |
| 4,540,714 A * | 9/1985 | Pedersen et al. | 518/714 |
| 4,590,314 A | 5/1986 | Kinkade | |
| 4,595,672 A * | 6/1986 | Ho et al. | 502/219 |
| 4,749,724 A | 6/1988 | Quarderer et al. | |
| 4,833,112 A * | 5/1989 | Przydrozny et al. | 502/304 |
| 4,853,359 A | 8/1989 | Morrison et al. | |
| 6,156,693 A | 12/2000 | Song et al. | |
| 6,451,729 B1 | 9/2002 | Song et al. | |
| 6,841,142 B1 * | 1/2005 | Tenne et al. | 423/509 |
| 7,048,781 B1 | 5/2006 | Lovell | |
| 7,223,713 B2 | 5/2007 | Alonso et al. | |

(Continued)

FOREIGN PATENT DOCUMENTS

EP  107358 A2  5/1984

(Continued)

OTHER PUBLICATIONS

Kruss, Justus Liebigs Annln. Chem., 225:1-57 (1884).

(Continued)

*Primary Examiner* — Timothy C Vanoy

(57) ABSTRACT

Methods and apparatus relate to catalysts and preparation of the catalysts, which are defined by sulfides of a transition metal, such as one of molybdenum, tungsten, and vanadium. Precursors for the catalysts include a metal ion source compound, such as molybdenum trioxide, and a sulfide ion source compound, such as thioacetamide. Once the precursors are dissolved if solid and combined in a mixture, homogenous precipitation from the mixture forms the catalysts. Exemplary uses of the catalysts include packing for a methanation reactor that converts carbon monoxide and hydrogen into methane.

18 Claims, 1 Drawing Sheet

U.S. PATENT DOCUMENTS 7,455,825 B2 * 11/2008 Jun et al. .................. 423/561.1

FOREIGN PATENT DOCUMENTS

| EP | 170973 | A3 | 2/1986 |
|---|---|---|---|
| EP | 216472 | A1 | 4/1987 |
| JP | 2002166181 | | 6/2002 |

OTHER PUBLICATIONS

Meyer, et al., "Direct Methanation—A New Method of Converting Synthesis Gas to Substitute Natural Gas," Prepr. Pap.—ACS Div. Fuel Chem. 27:109-15 (1982).

Payen, et al., "Morphology Study of MoS2- and WS2-Based Hydrotreating Catalysts by High-Resoultion Electron Microscopy," J. Catalysis 147:123-132 (May 1994).

Taniguchi, et al. "Preparation of zeolites incorporating molybdenum sulfide clusters with high C2 hydrocarbon selectivity in CO-H2 reactions," J. Chem. Soc., Chem. Commun. (1995), (24), 2533-4 CODEN: JCCCAT; ISSN: 0022-4936.

Osseo-Asare and Radovic, L.R., "Novel Nanodispersed Coal Liquefaction Catalysts: Molecular Design Via Microemulsion-Based Synthesis", Technical Progress Report, Apr.-Jun. 1991, Department of Materials Science and Engineering.

* cited by examiner

METAL SULFIDE CATALYSTS AND METHODS OF MAKING SAME

CROSS-REFERENCE TO RELATED APPLICATIONS

This application is a non-provisional application which claims benefit under 35 USC §119(e) to U.S. Provisional Application Ser. No. 61/181,179 filed May 26, 2009, entitled "METAL SULFIDE CATALYSTS AND METHODS OF MAKING SAME", which is incorporated herein in its entirety.

FIELD OF THE INVENTION

Embodiments of the invention relate to metal sulfide.

BACKGROUND OF THE INVENTION

Various compounds act as catalysts in applications to process feedstocks. Suitability of the catalysts depends on factors such as activity, preparation costs, susceptibility to deactivation, and selectivity for desired reactions. The catalysts can thus determine viability of processes such as methanation, which utilizes the catalysts to convert carbon monoxide and hydrogen gasses into methane.

Methanation reactions enable producing substitute natural gas (SNG) from coal by gasifying the coal to generate synthesis gas (syngas) and converting the syngas to the SNG via the methanation. Declining supplies of natural gas being produced and expanding demand for the natural gas cause natural gas prices to rise. Since coal resources are often more readily available than natural gas resources, the methanation provides an option for distributing these available energy sources as needed.

Prior compounds and preparation techniques for the compounds used as the catalysts in the methanation reactions impose operating limitations or prevent economic feasibility. Sulfur poisons nickel based compounds used for the catalyst in the methanation such that sulfur impurities from the feedstock must be removed within tolerances of the nickel based compounds. In addition, utilizing the nickel based compounds requires adjusting a hydrogen/carbon monoxide ratio since carbon deactivates the nickel based compounds. While prior molybdenum disulfide products when used as the catalyst for the methanation may lack such restrictions with respect to carbon and sulfur feedstock content, previous methods produce the molybdenum disulfide products with limited performance and/or require expensive precursor compounds such as ammonium tetrathiomolybdate.

Therefore, a need exists for metal sulfide catalysts and methods of preparing such catalysts.

SUMMARY OF THE INVENTION

In one embodiment, a method of preparing metal sulfide catalyst includes preparing a mixture that includes metal ions from a salt of one of molybdenum, tungsten and vanadium and a source of sulfur ions. The method further includes forming metal sulfide by subjecting the mixture to conditions that permit homogenous precipitation of metal sulfide particles.

According to one embodiment, a method of preparing molybdenum disulfide catalyst includes dissolving molybdenum trioxide and thioacetamide to provide a mixture. In addition, generating a precipitate within the mixture occurs by heating the mixture to cause homogenous precipitation. The precipitate that is collected provides molybdenum disulfide catalyst.

For one embodiment, a molybdenum disulfide catalyst includes a solid composition containing molybdenum disulfide. Properties of the composition include capability to achieve at least 80% carbon monoxide conversion in a methanation reaction. Conditions define the methanation reaction and are at 455° C. reactor temperature and 3171 kilopascal reactor pressure with a gas hourly space velocity of 2400 hr$^{-1}$ and feed gas flow of 37% hydrogen, 34% carbon monoxide, 1% hydrogen sulfide and 28% nitrogen.

BRIEF DESCRIPTION OF THE DRAWINGS

The invention, together with further advantages thereof, may best be understood by reference to the following description taken in conjunction with the accompanying drawings.

DETAILED DESCRIPTION OF THE INVENTION

Figure 1:
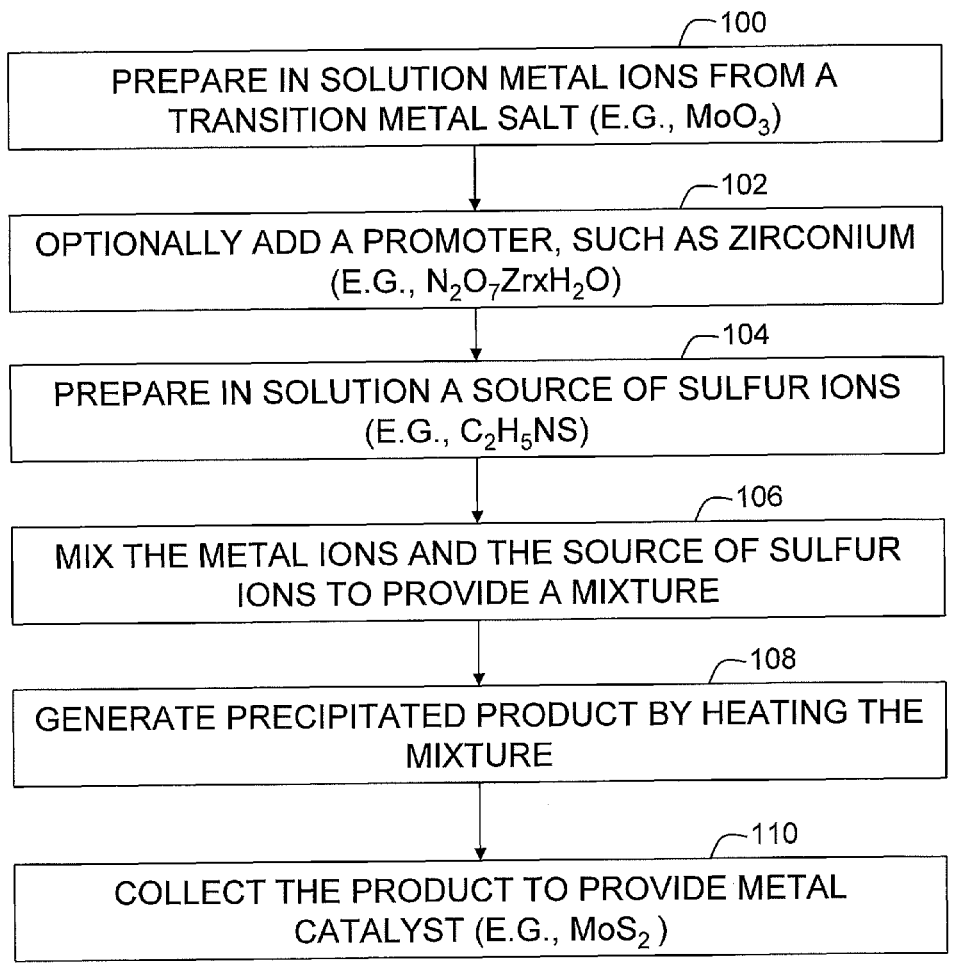
FIG. 1 is a flow chart illustrating a method of preparing molybdenum disulfide catalyst, according to one embodiment.

Embodiments of the invention relate to catalysts and preparation of the catalysts, which are defined by sulfides of a transition metal, such as one of molybdenum, tungsten, and vanadium. Homogenous precipitation forms the catalysts. Exemplary uses of the catalysts include packing for a methanation reactor that converts carbon monoxide and hydrogen into methane.

Precursors for the catalysts include a metal ion source compound, which may be a molybdenum salt, such as an oxide of molybdenum (e.g., molybdenum trioxide), ammonium thiomolybdate, molybdenum sulfide (lacking activity as high as products described herein), molybdenum pentachloride, and ammonium heptamolybdate. While particular reference is made to molybdenum and preparation of molybdenum disulfide catalysts, methods described herein may instead utilize salts of other transition metals, such as vanadium and tungsten. The precursors further include a sulfide ion source compound, such as thioacetamide, thiourea, and dimethyl disulfide. The thioacetamide and thiourea provide exemplary inorganic sulfur-containing solids dissolvable in aqueous solutions for mixing and which are capable of breaking into reactive sulfur species for subsequent homogenous precipitation as described herein. For the metal ion source compounds that are dissolvable in organic solutions, the dimethyl disulfide may also break into reactive sulfur species at reaction temperatures for the subsequent homogenous precipitation.

The metal ion and sulfide ion source compounds thus may define different compounds that are each liquid or dissolvable in a solvent. Once the precursors are dissolved if solid and combined in a mixture, the homogenous precipitation from the mixture forms the molybdenum disulfide catalysts. For some embodiments, the homogeneous precipitation occurs by heating the mixture. For example, the homogenous precipitation may occur upon heating the mixture to cause emitting of hydrogen sulfide from the thioacetamide dissolved in the mixture. The homogenous precipitation thereby refers to synthesizing precipitating agent throughout the mixture. Compared to adding a precipitating agent to the mixture and creating local uneven concentration gradients in order to form products, the homogenous precipitation can enable forming more uniform products with smaller particle sizes.

The catalysts may further include promoters, such as at least one of carbon, silicon, boron, cerium, thorium, uranium, niobium, zirconium, tantalum, cobalt, nickel and iron. During the precipitation, the mixture thus may contain ions of elements desired for the promoter such that homogenous co-precipitation may incorporate the promoter in the catalysts. For example, the mixture may include metal promoter salts that are dissolved.

Collecting of the precipitate that provides the molybdenum disulfide catalyst refers to any handling and treatment of the precipitate upon causing precipitation within the mixture. During further preparing of the catalyst, pelletizing the precipitate after being filtered, washed and dried shapes the precipitate into solid particles. In some embodiments, presulfiding and/or decomposing the solid particles adjusts ratio of molybdenum to sulfur within the precipitate and may promote creating a desirable form of molybdenum disulfide ($MoS_2$).

In some embodiments, the mixture that is created contains dissolved solutes including both the molybdenum trioxide ($MoO_3$) and the thioacetamide ($C_2H_5NS$). The solutes for some embodiments further include a metal promoter, such as a zirconium-containing compound that may be a zirconium salt (e.g., zirconyl nitrate hydrate ($H_2N_2O_8Zr$)). One or more suitable solvents enable dissolution of the solutes for forming the mixture, which with the molybdenum trioxide and the thioacetamide may be aqueous such that addition of water controls dilution of the solutes to desired levels for proper homogenous co-precipitation. In some embodiments, acids and/or bases facilitate in dissolving the solutes and/or adjusting pH of the mixture.

FIG. 1 shows a flow chart for an exemplary method of preparing molybdenum disulfide catalyst. In a first dissolution step 100, molybdenum trioxide is dissolved in any base (e.g., an alkali metal hydroxide) given that the molybdenum trioxide does not dissolve in acidic solutions. Dissolving the molybdenum trioxide in the base provides a first solution. Addition of water to the first solution dilutes solute concentration within the first solution.

For some embodiments, a promoter addition step 102 introduces a promoter compound into the first solution. During subsequent precipitation, the promoter compound may result in incorporating another metal in addition to molybdenum into the molybdenum disulfide catalyst. Utilizing zirconyl nitrate hydrate as the promoter thereby makes the molybdenum disulfide catalyst contain zirconium. Adding any acid to the first solution adjusts pH of the first solution from basic to acidic since solubility of the zirconyl nitrate hydrate increases as pH is lowered. Suitability for the acid and the base utilized with the first solution depend on ability and ease in removing ions, such as nitrates from exemplary nitric acid used as the acid. Once acidified, adding the promoter may occur by mixing with the first solution an amount of zirconyl nitrate hydrate dissolved in water. While acidification may not be necessary depending on solubility of the promoter selected and/or absence of the promoter, acidity of the first solution after adding the acid is sufficient (e.g., pH range between 3 and 5) to ensure that the zirconyl nitrate hydrate is or stays dissolved when mixed with the molybdenum trioxide that also stays dissolved after acidification. Acidification is thus avoided if the metal ion source compound selected results in premature precipitation upon adding the acid prior to the homogenous precipitation that is desired.

During a second dissolution step 104, thioacetamide is dissolved in water to provide a second solution. Heating the second solution above ambient facilitates dissolution of the thioacetamide without causing formation of the hydrogen sulfide if less than about 65° C. Embodiments that utilize different sources for the sulfide ion source compound thus may be heated to different respective dissolution and/or hydrogen sulfide formation temperature thresholds. The first solution may also be heated to between ambient (e.g., about 21° C.) and about 90° C. prior to combining the first and second solutions in a mixing step 106. Since decomposition rate of the thioacetamide increases as pH is lowered, such heating provides temperature of the first and second solutions upon mixing sufficient to ensure that the thioacetamide stays dissolved even once the second solution is combined with the first solution that is acidic. Combining the first and second solutions in the mixing step 106 produces a mixture. For some embodiments, the solute concentrations within the mixture correspond to a molybdenum trioxide to thioacetamide ratio of between 1:2 and 1:4 by weight. Further, the solute concentrations within the mixture may if the promoter is present correspond to a molybdenum trioxide to zirconyl nitrate hydrate ratio of between 1:1 and 4:1 by weight.

Precipitation step 108 is accomplished by heating the mixture to a temperature above about 90° C. up to a boiling point of the solvent (e.g., 100° C.) and then maintaining such elevated temperature for a time period (e.g., at least 1 hour) to permit all or a sufficient percentage of the precipitation to occur. Precipitate recovery step 110 separates and collects the solid precipitate by filtration. The precipitate collected in the recovery step 110 provides the molybdenum disulfide catalyst.

In some embodiments, the precipitate recovery step 110 includes filtering the mixture to isolate the precipitate. Next, washing the precipitate with water and then a volatile fluid, such as acetone or ethanol, removes unwanted impurities from the precipitate and rids the precipitate of water. The precipitate after being washed undergoes drying under an inert or nitrogen atmosphere at a temperature (e.g., between 50° C. and 150° C.) above ambient to facilitate evaporation for a duration of at least three hours, or until the precipitate has a constant weight. Once dried, the precipitate can be made into tablets by compression in a metal die to form cylindrical pellets or otherwise shaped to form catalyst particles.

In some embodiments, treating the precipitate with elemental sulfur enhances stability of the catalyst particles. For example, the treating may include mixing the precipitate, prior to drying the precipitate, in a suspension of the elemental sulfur dispersed in a liquid, such as acetone. The precipitate and elemental sulfur together then undergo drying and further collecting as described herein.

While not limited to any particular theory, it is believed that the precipitate may include molybdenum trisulfide ($MoS_3$) prior to any reduction processing of the precipitate. The molybdenum trisulfide thus becomes an intermediate to formation of the molybdenum disulfide. Decomposing the pellets of the precipitate converts the molybdenum trisulfide into the molybdenum disulfide. Presulfiding the pellets of the precipitate may occur prior to the reducing to ensure this conversion proceeds without over reduction of molybdenum disulfide. During the presulfiding, the pellets of the precipitate contact a flow of a sulfur-containing fluid, such as dimethyl disulfide ($C_2H_6S_2$) or hydrogen sulfide ($H_2S$), while disposed within a reactor heated to above 300° C. The reduction of the precipitate includes exposing the precipitate to a reducing environment. Temperatures above 300° C. or between 400° C. and 700° C. along with contact of the precipitate with a hydrogen-containing gas define conditions for the reducing environment. In combination with hydrogen gas, the hydrogen-containing gas may include hydrogen sulfide and dimethyl disulfide to prevent over reduction of the molybdenum disulfide catalyst.

EXAMPLES

A first solution was prepared by dissolving 3.33 grams of molybdenum trioxide in 11 milliliters (ml) of ammonium hydroxide. Once dissolved, the first solution was diluted to 100 ml with de-ionized (DI) water. Concentrated nitric acid was added to the first solution to lower pH from 9.121 to 4. The first solution was further mixed with 1.071 grams of zirconyl nitrate hydrate dissolved in 5 grams of DI water.

A second solution was made by dissolving 10.438 grams of thioacetamide in 100 ml of water at 60° C. The first solution was heated to 60° C. Both the first and second solutions were combined and heated to 95° C. The temperature was held at 95° C. for 2 hours. A black solid precipitate formed during the heating. The precipitate was then filtered, washed with distilled water first and then washed with acetone. A resultant cake was dried in an oven under nitrogen atmosphere at 80° C. for 4 hours and then pelletized to form precipitate pellets.

The precipitate pellets were pre-sulfided and reduced. A 12.7 millimeter reactor was loaded with 3.8 grams of the pellets mixed with 6.2 ml of alundum. The reactor was heated to 450° C. at 3171 kilopascal with nitrogen flowing through the reactor at a rate of 45 cubic centimeters per minute (cc/min) along with dimethyl disulfide (DMDS) flowing at 0.1 ml per hour (ml/hr). When the temperature reached 450° C., flow of the nitrogen was switched to a stream of hydrogen at a 45.5 cc/min flow rate along with DMDS flowing at 0.15 ml/hr. The reactor was kept at 500° C. under hydrogen and DMDS for 5 hours in order to provide a sample molybdenum disulfide catalyst.

A fixed bed activity test was performed on the sample molybdenum disulfide catalyst. For the activity test, unless otherwise stated, reactor pressure was 3171 kilopascal (kPa) with a gas hourly space velocity (GHSV) of 2400 $hr^{-1}$ and hydrogen to carbon monoxide ratio ($H_2$/CO) of 1.08. Reactor temperature was set at 455° C. In particular, a feed gas stream was about 37% $H_2$, 34% CO, 1% $H_2S$ and 28% $N_2$, which substituted for other inert gasses. The hydrogen to carbon ratio of 1.08 used for the test illustrated suitability of the catalyst for coal derived syngas without having to adjust the ratio to higher values with water gas shift reactions. The hydrogen sulfide within the feed gas stream simulated sulfur impurities common in syngas and that can poison prior catalysts. Such sulfur content illustrated ability to process syngas in which sulfur impurities are removed to meet requirements (e.g., 4 parts per million sulfur) for natural gas pipeline transport of produced methane without having to be reduced to limitations (e.g., 20 parts per billion) imposed by some prior catalysts (i.e., nickel based materials).

Results of the activity test were determined throughout a runtime of about 40 hours. Carbon monoxide conversion obtained was about 80% with conversion after initial startup dropping less than 5 percentages by an end of the runtime. Given the carbon to hydrogen ratio, substantially no water was produced along with main products defined by carbon dioxide and methane. Methane selectivity, as defined by relative conversion of the carbon monoxide into methane compared to carbon dioxide, of about 52% resulted based on methane and carbon dioxide yields.

A comparative catalyst was prepared. The comparative catalyst was prepared using ammonium tetrathiomolybdate (($NH_4)_2MoS_4$) as the molybdenum precursor. The comparative catalyst preparation began with the precipitation of amorphous $MoS_3$ along with zirconium dioxide ($ZrO_2$). A salt solution was prepared by mixing two aqueous solutions—4 grams of ammonium tetrathiomolybdate in 61.52 ml of water, and 1.776 grams of zirconyl nitrate hydrate in 6 ml of water. The salt solution was further acidified with diluted nitric acid. The resulting slurry was filtered and washed with distilled water and acetone. A resultant cake was added to 1.538 grams of sulfur stirred in acetone. After removing excess acetone, the resultant cake was dried, pre-sulfided and reduced as described herein with respect to the sample molybdenum disulfide catalyst. The activity test as set forth herein was conducted again using the comparative sample.

While the sample molybdenum disulfide catalyst prepared in accordance with one embodiment provided about 80% conversion of carbon monoxide, the comparative sample only resulted in about 74% conversion of carbon monoxide. In addition to superior results, the ammonium tetrathiomolybdate used as precursor for the comparative sample increases expense relative to using molybdenum trioxide as precursor for the sample molybdenum disulfide catalyst due to orders of magnitude differences in precursor costs. Further, the sample molybdenum disulfide catalyst unlike the comparative example can avoid use of elemental sulfur, which can present problems upon being sublimed in downstream pipes.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described herein. It is the intent of the inventors that variations and equivalents of the invention are within the scope of the claims below and the description, abstract and drawings are not to be used to limit the scope of the invention.

What is claimed is:

1. A method comprising the steps of:
   preparing a mixture comprising metal ions from a salt of one of molybdenum, tungsten and vanadium and a source of sulfur ions; and
   forming metal sulfide by subjecting the mixture to conditions that permit homogenous precipitation of metal sulfide particles;
   wherein the source of sulfur ions is thioacetamide.

2. The method according to claim 1, wherein the salt is a molybdenum salt.

3. The method according to claim 1, wherein the salt is molybdenum trioxide.

4. The method according to claim 1, wherein the mixture further includes zirconium ions from a zirconium salt.

5. The method according to claim 1, further comprising shaping the metal sulfide particles into catalyst material.

6. The method according to claim 1, further comprising loading the metal sulfide particles into a methanation reactor that converts carbon monoxide and hydrogen into methane.

7. The method according to claim 1, wherein the source of sulfur ions is different from the salt.

8. A method comprising the steps of:
   preparing a mixture comprising metal ions from a salt of one of molybdenum, tungsten and vanadium and a source of sulfur ions; and
   forming metal sulfide by subjecting the mixture to conditions that permit homogenous precipitation of metal sulfide particles;
   wherein the mixture further includes zirconium ions from zirconyl nitrate hydrate.

9. A method comprising the steps of:
preparing a mixture comprising metal ions from a salt of one of molybdenum, tungsten and vanadium and a source of sulfur ions; and
forming metal sulfide by subjecting the mixture to conditions that permit homogenous precipitation of metal sulfide particles;
wherein the metal sulfide particles have an activity defined by at least 80% carbon monoxide conversion being achievable in a methanation reaction under conditions defined by a 455° C. reactor temperature and 3171 kilopascal reactor pressure with a gas hourly space velocity of 2400 hr$^{-1}$ and feed gas flow of 37% hydrogen, 34% carbon monoxide, 1% hydrogen sulfide and 28% nitrogen.

10. A method comprising the steps of:
dissolving molybdenum trioxide and thioacetamide to provide a mixture;
generating a precipitate within the mixture by heating the mixture to cause homogenous precipitation; and
collecting the precipitate, wherein the precipitate that is collected provides molybdenum disulfide catalyst.

11. The method according to claim 10, further comprising dissolving zirconyl nitrate hydrate added to the mixture.

12. The method according to claim 10, further comprising sulfiding and then reducing the precipitate, wherein the sulfiding and the reducing occur at above 300° C.

13. The method according to claim 10, further comprising loading the molybdenum disulfide catalyst into a methanation reactor that converts carbon monoxide and hydrogen into methane.

14. The method according to claim 10, wherein the molybdenum disulfide catalyst that is collected has an activity defined by at least 80% carbon monoxide conversion being achievable in a methanation reaction under conditions defined by a 455° C. reactor temperature and 3171 kilopascal reactor pressure with a gas hourly space velocity of 2400 hr$^{-1}$ and hydrogen to carbon monoxide ratio of 1.08.

15. The method according to claim 10, further comprising:
adding an acid to a first solution into which the molybdenum trioxide is dissolved to reduce pH of the first solution from basic to acidic;
dissolving zirconyl nitrate hydrate in the first solution that is made acidic; and
mixing the first solution with a second solution in which the thioacetamide is dissolved in order to form the mixture.

16. The method according to claim 10, wherein generating the precipitate occurs by heating the mixture to above 90° C.

17. A molybdenum disulfide catalyst, comprising:
a solid composition containing molybdenum disulfide and prepared to achieve at least 80% carbon monoxide conversion in a methanation reaction, wherein conditions of the methanation reaction are defined by a 455° C. reactor temperature and 3171 kilopascal reactor pressure with a gas hourly space velocity of 2400 hr$^{-1}$ and feed gas flow of 37% hydrogen, 34% carbon monoxide, 1% hydrogen sulfide and 28% nitrogen.

18. The catalyst according to claim 17, wherein the solid composition further contains zirconium.

* * * * *